US010963387B2

(12) United States Patent
Cain, III et al.

(10) Patent No.: US 10,963,387 B2
(45) Date of Patent: Mar. 30, 2021

(54) METHODS OF CACHE PRELOADING ON A PARTITION OR A CONTEXT SWITCH

(71) Applicant: International Business Machines Corporation, Armonk, NY (US)

(72) Inventors: Harold W. Cain, III, Raleigh, NC (US); Vijayalakshmi Srinivasan, New York, NY (US); Jason Zebchuk, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/353,354

(22) Filed: Mar. 14, 2019

(65) Prior Publication Data
US 2019/0213132 A1    Jul. 11, 2019

Related U.S. Application Data

(63) Continuation of application No. 15/729,121, filed on Oct. 10, 2017, now Pat. No. 10,268,588, which is a (Continued)

(51) Int. Cl.
*G06F 12/08*      (2016.01)
*G06F 12/0862*    (2016.01)
(Continued)

(52) U.S. Cl.
CPC ...... *G06F 12/0862* (2013.01); *G06F 12/1009* (2013.01); *G06F 12/122* (2013.01);
(Continued)

(58) Field of Classification Search
CPC ...... H04L 49/90; G06F 12/112; G06F 12/123; G06F 12/1009; G06F 12/0862
See application file for complete search history.

(56) References Cited

U.S. PATENT DOCUMENTS 5,893,147 A    4/1999  Deng
6,339,813 B1   1/2002  Smith, III et al.
(Continued)

OTHER PUBLICATIONS

Brown, J. et al., "Fast Thread Migration via Cache Working Set Prediction" Proceedings of the 17th Annual Symposium on High Performance Computer Architecture (Feb. 2011) pp. 193-204.
(Continued)

*Primary Examiner* — Ryan Bertram
*Assistant Examiner* — Trang K Ta
(74) *Attorney, Agent, or Firm* — Scully, Scott, Murphy & Presser, P.C.; Vazken Alexanian

(57) ABSTRACT

A scheme referred to as a "Region-based cache restoration prefetcher" (RECAP) is employed for cache preloading on a partition or a context switch. The RECAP exploits spatial locality to provide a bandwidth-efficient prefetcher to reduce the "cold" cache effect caused by multiprogrammed virtualization. The RECAP groups cache blocks into coarse-grain regions of memory, and predicts which regions contain useful blocks that should be prefetched the next time the current virtual machine executes. Based on these predictions, and using a simple compression technique that also exploits spatial locality, the RECAP provides a robust prefetcher that improves performance without excessive bandwidth overhead or slowdown.

20 Claims, 6 Drawing Sheets

Related U.S. Application Data continuation of application No. 15/375,913, filed on Dec. 12, 2016, now Pat. No. 9,804,967, which is a continuation of application No. 14/809,631, filed on Jul. 27, 2015, now Pat. No. 9,529,723, which is a continuation of application No. 13/545,304, filed on Jul. 10, 2012, now Pat. No. 9,092,341.

(51) Int. Cl.
*G06F 12/123* (2016.01)
*G06F 12/122* (2016.01)
*G06F 12/1009* (2016.01)
G06F 12/0813 (2016.01)
G06F 12/0866 (2016.01)
G06F 12/12 (2016.01)

(52) U.S. Cl.
CPC ........ *G06F 12/123* (2013.01); *G06F 12/0813* (2013.01); *G06F 12/0866* (2013.01); *G06F 12/12* (2013.01); *G06F 2212/602* (2013.01)

(56) References Cited

U.S. PATENT DOCUMENTS

| | | |
|---|---|---|
| 8,954,709 B2 | 2/2015 | Nishiguchi et al. |
| 9,239,793 B2 | 1/2016 | Riguer et al. |
| 9,418,011 B2 | 8/2016 | Soares et al. |
| 2003/0023663 A1 | 1/2003 | Thompson et al. |
| 2006/0107024 A1 | 5/2006 | Cypher |
| 2007/0033371 A1 | 2/2007 | Dunshea et al. |
| 2008/0201530 A1 | 8/2008 | Franaszek et al. |
| 2010/0191921 A1 | 7/2010 | Cantin |
| 2010/0281221 A1* | 11/2010 | Cantin ................ G06F 12/0815 711/132 |
| 2011/0228674 A1* | 9/2011 | Pais ........................ H04L 49/90 370/235 |
| 2012/0030275 A1 | 2/2012 | Boller et al. |
| 2012/0317364 A1 | 12/2012 | Loh |
| 2014/0006698 A1 | 1/2014 | Chappell et al. |

OTHER PUBLICATIONS

Cui, H. et al., "Extending Data Prefetching to Cope with Context Switch Misses" Proceedings of the 2009 IEEE International Conference on Computer Design (Oct. 4-7, 2009) pp. 260-267.

Daly, D. et al., "Cache Restoration for Highly Partitioned Virtualized Systems" Proceedings of the 18th Annual Symposium on High Performance Computer Architecture (Feb. 25-29, 2012) pp. 1-10.

Mogul, J. et al., "The Effect of Context Switches on Cache Performance" Proceedings of the Fourth International Conference on Architectural Support for Programming Languages and Operating Systems (Apr. 1991) pp. 75-84.

Somogyi, S. et al., "Spatial Memory Streaming" Proceedings of the 33rd Annual International Symposium on Computer Architecture (Jun. 2006) pp. 252-263.

* cited by examiner

METHODS OF CACHE PRELOADING ON A PARTITION OR A CONTEXT SWITCH

CROSS REFERENCE TO RELATED APPLICATIONS

This application is a continuation of copending U.S. patent application Ser. No. 15/729,121, filed Oct. 10, 2017, which is a continuation of U.S. patent application Ser. No. 15/375,913, filed Dec. 12, 2016, which is a continuation of U.S. patent application Ser. No. 14/809,631, filed Jul. 27, 2015, which is a continuation of U.S. patent application Ser. No. 13/545,304, filed Jul. 10, 2012. The entire contents and disclosure of U.S. patent application Ser. Nos. 15/729,121, 15/375,913, 14/809,631 and 13/545,304 are hereby incorporated herein by reference in their entireties.

BACKGROUND

The present disclosure generally relates to a method of cache preloading on a partition or a context switch, and a system for implementing the same.

Virtualization has become a "magic bullet", providing a means to increase utilization, improve security, lower costs, and reduce management overheads. In some scenarios, the number of virtual machines consolidated onto a single processor has grown even faster than the number of hardware threads provided by modern processor. Multiprogrammed virtualization allows multiple virtual machines to time-share a single processor core, however this fine-grain sharing comes at a cost. Each time a virtual machine gets scheduled by a hypervisor, it effectively begins with a "cold" cache, since any cache blocks it accessed in the past have likely been evicted by other virtual machines executing on the same processor.

Server consolidation, virtual desktop infrastructure (VDI) environments, and cloud computing trends dominate the landscape of new server purchases. The growth of these trends has led not only to a much wider adoption of hardware virtualization, but also to an increasing number of virtual instances, or partitions, being consolidated onto each physical system. For example, International Business Machines Corporation (IBM) has reported a case study of consolidating 3,900 servers onto only 30 mainframe systems and a number of virtualization software case studies have reported consolidation ratios from 4:1 to 15:1. As another example, B. Botelho, "Virtual machines per server, a viable metric for hardware selection?" available at http://itknowledgeexchange.techtarget.com/server-farm/virtual-machines-per-server-a-viable-metric-for-hardwareselection, has suggested that in virtual desktop infrastructure (VDI) environments a good rule of thumb is to combine six to eight virtual desktop instances per processor core. In the future, the number of partitions on each machine is expected to continue to increase.

Consolidating many partitions onto a single system generally requires some form of multiprogrammed virtualization in which multiple partitions time-share a single hardware thread. To meet quality of service (QoS) constraints and provide real-time interactive response times, the execution interval for each partition is kept relatively short. For instance, the PowerVM partition manager available at IBM allocates some portion of a 10 ms dispatch window to each active partition, such that a system with ten partitions might execute each partition for only 1 ms at a time within the 10 ms window. A number of virtualization software case studies provide good examples of why short response times are important in VDI environments as they implement VDI in hospitals, including in urgent care departments and other "mission critical" applications.

Multiprogrammed virtualization incurs overheads each time the hypervisor switches partitions, with much of this slowdown coming from the loss of microarchitectural state in the processor. While a partition is switched out, other partitions pollute the processor's caches, branch predictors, and translation lookaside buffers (TLBs). By the time the first partition is subsequently scheduled for its next execution interval, the intervening partitions might have evicted all of its state, resulting in an almost cold cache. While these effects could be amortized by executing each partition for longer periods of time, the need to maintain fast response times limits the applicability of this solution.

SUMMARY

A method referred to as a "Region-based cache restoration prefetcher" (RECAP) is employed for cache preloading on a partition or a context switch. The RECAP exploits spatial locality to provide a bandwidth-efficient prefetcher to reduce the "cold" cache effect caused by multiprogrammed virtualization. The RECAP groups cache blocks into coarse-grain regions of memory, and predicts which regions contain useful blocks that should be prefetched the next time the current virtual machine executes. Based on these predictions, and using a compression technique that also exploits spatial locality, the RECAP provides a robust prefetcher that improves performance without excessive bandwidth overhead or slowdown.

This disclosure leverages an observation that, for most workloads tracking, a relatively small number of coarse-grain regions are sufficient to capture a large portion of an application's cache working set. Tracking block reuse within regions can be employed as an effective way to reduce the amount of bandwidth wasted prefetching blocks within a region that will not be accessed.

The RECAP is a bandwidth-efficient region-based cache restoration prefetcher that tracks data access patterns at a coarse granularity region including $2^{p+q}$ bytes. Each region includes $2^p$ blocks, and each block includes $2^q$ bytes. The RECAP can achieve comparable or better performance compared to prior art schemes while significantly reducing the overall bandwidth requirement.

The RECAP is a robust method that consistently uses less bandwidth to achieve similar performance benefits compared to previous schemes. Hardware mechanisms are provided to reduce the performance impact caused by the common cold cache problem created by multiprogrammed virtualization.

According to an aspect of the present disclosure, a computing system is provided, which includes: a processor; a cache in communication with the processor; a main memory in communication with the cache; and a region access table (RAT) configured to track access of memory blocks in the main memory, wherein the RAT includes a plurality of RAT entries. Each of the RAT entries includes: a region group identifier configured to store region group identifier bits that identify a region of the main memory that includes a plurality of memory blocks; and a block presence vector configured to store block presence identifier bits that identify at least one block among the plurality of memory blocks, wherein the block presence vector represents at least one block corresponding to an address specified by the processor during a cache access.

According to another aspect of the present disclosure, a method for operating a computing system is provided. The method includes: providing a computing system that includes: a processor; a cache in communication with the processor; a main memory in communication with the cache; and a region access table (RAT) configured to track access of memory blocks in the main memory, wherein the RAT includes a plurality of RAT entries, and each of the RAT entries includes a region group identifier and a block presence vector. The method further comprises: upon an access of the cache by the processor for data in a byte in a block of a region including plurality of memory blocks and located within the main memory, storing region group identifier bits that identify the region in a region group identifier of a selected RAT entry among the plurality of RAT entries; and upon the access of the cache, storing block presence identifier bits that identify at least one block among the plurality of memory blocks in a block presence vector of the selected RAT entry, wherein a bit of the block presence vector represents the block.

DETAILED DESCRIPTION

As stated above, the present disclosure relates to a method of cache preloading on a partition or a context switch and a system for implementing the same, which are now described in detail.

As used herein, an element is "configured" to perform a task if the element has a hardware that implements the task through operation of components of the hardware alone, or through a combination of operation of components of the hardware and a program loaded into that hardware or into a processor in communication with that hardware.

As used herein, an "access" by a processor to a cache refers to a request from the processor to the cache to return data stored within at least one byte within a main memory to the processor.

As used herein, a "cache hit" refers to an event in which the data requested by a processor resides within the cache, and the cache returns the data to the processor.

As used herein, a "cache miss" refers to an event in which the data requested by a processor does not reside within the cache, and the cache is forced to resort to communication with a main memory to fetch the data from the main memory to the cache and to subsequently return the fetched data to the processor.

As used herein, virtualization is the creation of a virtual (rather than actual) version of something, such as a hardware platform, operating system (OS), storage device, or network resources.

As used herein, a "partition" refers to a subset of computer's hardware resources, virtualized as a separate computer. A partition can be a virtual instance that is mapped to physical resources. For example, a partition can include an operating system and other system software along with the workloads, and can assumes a virtual instance of the computer system to execute the workload. Such a virtual instance can be mapped to physical hardware resources to constitute a partition.

As used herein, a "context switch" refers to the computing process of storing and restoring the state (context) of a CPU so that execution can be resumed from the same point at a later time. Context switches allow multiple tasks to share the same physical hardware in a time-shared manner.

A "region-based cache restoration prefetcher" (RECAP) scheme reduces the bandwidth overhead of cache restoration prefetching by using a more compact representation of block addresses, and by avoiding prefetches for blocks predicted not to be useful during the next execution interval. To accomplish this, RECAP leverages spatial locality and common behavior within coarse-grain regions (which is larger than blocks) of memory while still maintaining enough fine-grain information to identify and prefetch individual cache blocks.

Figure 1:
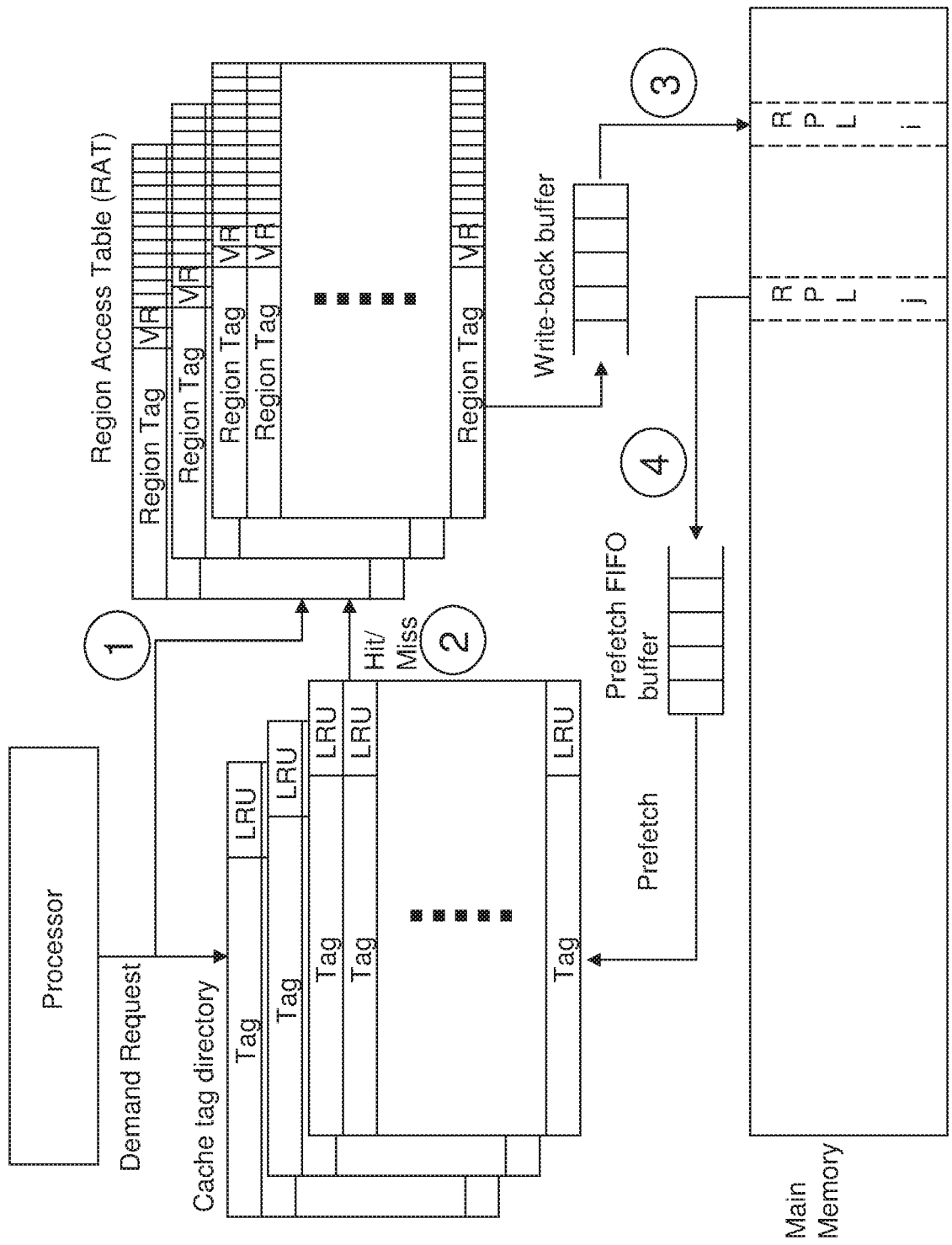
FIG. 1 is a schematic diagram illustrating a first exemplary hardware configuration for a region-based cache restoration prefetcher (RECAP) according to an embodiment of the present disclosure.

Referring to FIG. 1, a schematic diagram illustrating a first exemplary hardware configuration for a region-based cache restoration prefetcher (RECAP) according to an embodiment of the present disclosure is illustrated. The RECAP is a scheme for storing data on cache accesses as a list (herein referred to as a "region prefetch list") in a portion of the main memory upon ending a task, for example, on a partition switch or a context switch, and for prefetching data for cache restoration from the main memory on a next partition switch or context switch that resumes the task. The RECAP can be employed by utilizing the hardware for the RECAP and a supporting software that runs in a processor, which can be a hypervisor.

In a computing system which includes a processor, a cache including a cache tag directory and in communication with the processor, and a main memory in communication with the cache, a RECAP hardware can include four components: a region access table (RAT), a set of region prefetch lists (RPL's) that can be stored in a portion of a main memory, a write-back buffer that can be relatively small in size, and a prefetch first-in-first-out (FIFO) buffer that can be used to write from the RPL's to the cache. The RECAP hardware tracks regions using the region access table (RAT).

The regions include a plurality of memory blocks within the main memory. Each of the memory blocks in the main memory can include $2^q$ bytes, and each of the region of the main memory can include $2^p$ memory blocks. Each of the p and the q are positive integers. In one embodiment $2^q$ bytes can refer to a cache block (or line) size. Cache block size is the size of the contiguous block of memory brought into cache from the main memory to service a cache miss. In one embodiment, each of the p and the q can be in a range from, and including, 1 to, and including, 24, i.e., $1 \leq p \leq 24$, and $1 \leq q \leq 24$. The value of p and the value of q can be independent of each other. In one embodiment, each of the p and the q can be in a range from, and including, 4 to, and including, 12, i.e., $4 \leq p \leq 12$, and $4 \leq q \leq 12$.

Specifically, memory blocks each having a size of $2^q$ bytes are grouped into contiguous $2^{p+q}$ byte sized regions of memory. Thus, each region includes $2^p$ memory blocks. The RECAP uses fewer bits to identify the blocks that need to be prefetched. This reduces the amount of bandwidth used when these block addresses need to written to or read from main memory.

In an exemplary illustration, assuming 64-byte cache blocks, 4 kB regions (i.e., regions each having a size of 4 kB), and 46-bit physical addresses in one hardware implementation, up to 64 cache blocks can be identified using a 34-bit tag and a 64-bit vector for an overhead of 1.5 bits per block. Simply listing the block addresses, on the other hand, requires 40 bits per block. Of course, not all blocks within every region will need to be prefetched, and in the worst case, when only one block in a region needs to be prefetched, that single block requires 98 bits to identify it. However, for the workloads studied during the course of a study leading to the present disclosure, the regions present in the cache at the end of a partition switch contain an average of 17 blocks, resulting in an overhead of 5.6 bits per block, seven times less than required for simply listing the block addresses.

In addition to reducing overhead for block addresses, the RECAP also reduces the number of wasted prefetches by exploiting common behavior within a memory region to predict which blocks are least likely to be useful after a partition switch and to avoid prefetching those blocks. If history tends to repeat itself during operation of a task, then blocks in the cache that have experienced cache hits are likely to see more hits in the future, and those that have never seen any cache hits are unlikely to experience any in the future. Although this may not be true of all blocks, the RECAP can serve as a first-order filter to predict which blocks are unlikely to be useful if they are prefetched after a partition switch.

While this simple behavior applies to individual cache blocks, tracking cache hits at the granularity of 4 kB regions of memory requires less overhead. The use of coarse-grain regions also allows more cache blocks to benefit from the past experience of nearby blocks that likely exhibit similar behavior. Filtering individual blocks based on whether they have experienced cache hits can be prejudicial to very young cache blocks that have recently been brought into the cache but have not yet had time to experience a cache hit. However, assuming that blocks within a region of memory have similar behaviors, a cache hit for one block in a region can serve as a prediction that newly accessed cache blocks within the same region are also likely to experience cache hits in the future. The RECAP exploits this behavior by identifying regions where at least one cache block has seen a cache hit and only prefetching blocks from these regions. This reduces the overhead of tracking which individual blocks have experienced cache hits, and at the same time makes the RECAP slightly less aggressive in filtering out blocks that have not seen cache hits.

The RECAP exploits common behavior within coarse-grain regions of memory to provide a space-efficient structure that tracks a sub-set of memory blocks that are very likely to be accessed after a partition switch. The block diagram in FIG. 1 illustrates how the RECAP performs the tasks of tracking accesses to individual blocks using a region access table (RAT) (represented by the numeral 1 within a circle), tracking which regions have seen cache hits (represented by the numeral 2 within a circle), saving reused regions in a region prefetch list (RPL) in a memory when a partition is switched out (represented by the numeral 3 within a circle), and reading the region prefetch list from memory and issue prefetches when a partition is rescheduled (represented by the numeral 4 within a circle). By combining coarse-grain and fine-grain information, the RECAP accomplishes these tasks with low memory overhead and small hardware structures as described below.

The plurality of RAT entries is organized as an M×N array of RAT entries. For example, each sheet including region tags in FIG. 1 can correspond to a single column including M entries corresponding to M rows within a single column, and the total number of sheets can be N, i.e., the number of columns.

Figure 2:
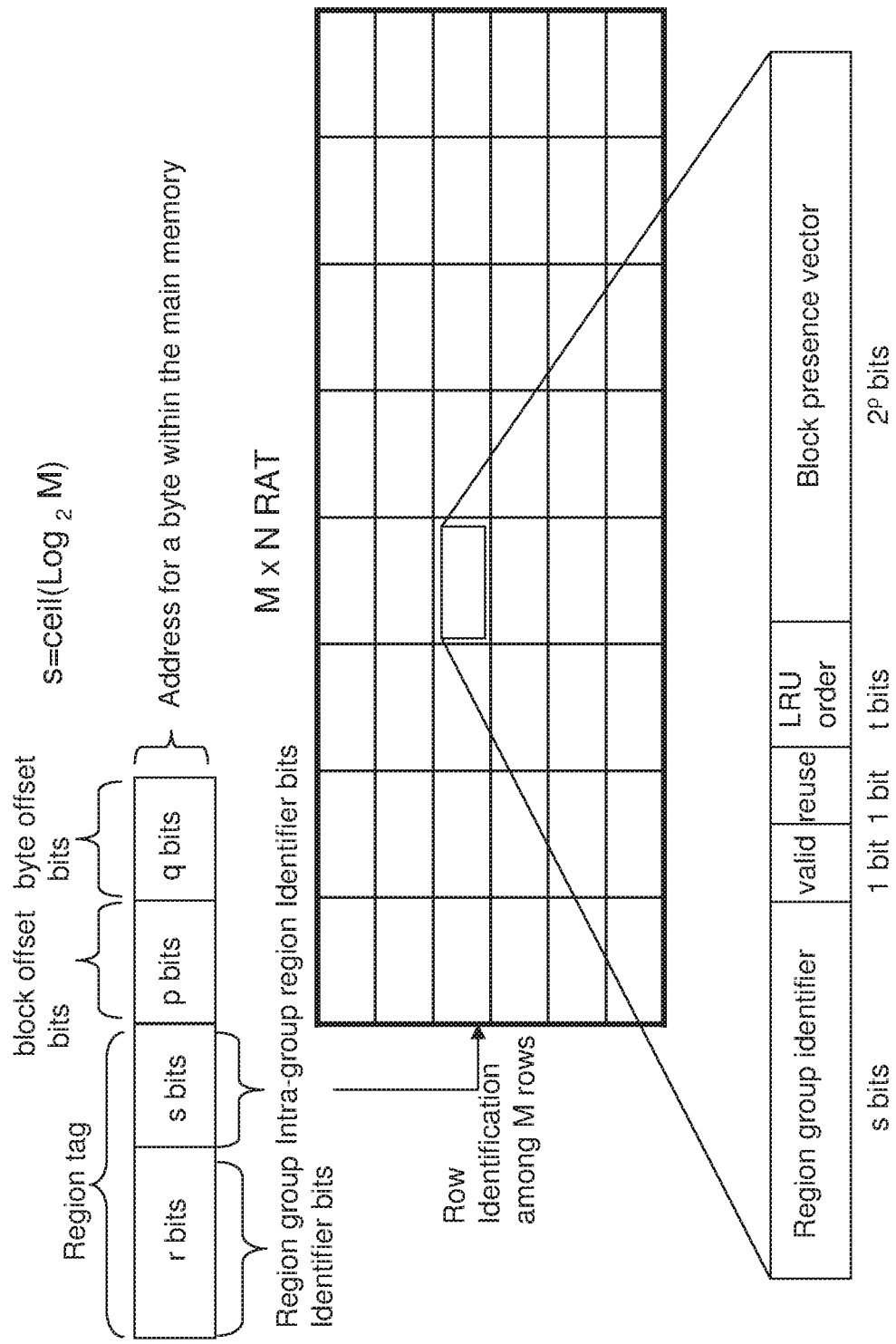
FIG. 2 is a schematic diagram illustrating a first exemplary Region Access Table (RAT) according to an embodiment of the present disclosure.

Referring to FIG. 2, a first exemplary RAT according to an embodiment of the present disclosure is illustrated. The region access table (RAT) is configured to track access of memory blocks in the main memory. The RAT includes a plurality of RAT entries. Each of the RAT entries includes a region group identifier and a block presence vector. The region group identifier in each RAT entry is configured to store region group identifier bits, which identify a region of the main memory that includes a plurality of memory blocks. The block presence vector in each RAT entry is configured to store block presence identifier bits, which identify at least one block among the plurality of memory blocks. The block presence vector represents at least one block corresponding to an address specified by the processor during a cache access.

When the processor requests data for a specified byte by identifying the address of the main memory, the address is broken into address components representing a region tag that refers to a region, block offset bits that identify the offset of the block containing the specified address with respect to the first block within the same region, and byte offset bits that identify the offset of the specified byte with respect to the first address within the same block. Further, the region tag can be broken into region group identifier bits that identifies the group of regions sharing the same most important bits within the region tag, and intra-group region identifier bits which identifies the offset of the region including the specified address with respect to the first region within the same region group.

In one embodiment, if the region tag includes r+s bits needed to identify a region, the region group identifier bits can be the r most important bits of the r+s bits, and the intra-group region identifier bits can be the s least important bits of the r+s bits. If each region includes $2^p$ blocks, the block offset bits has p bits. If each block includes $2^q$ bytes, the byte offset bits can have q bits.

The first exemplary RAT is a set-associative lookup structure. Each entry within the first exemplary RAT contains a region group identifier that is derived from a region tag, a valid bit (V), a reuse bit (R), and a presence vector containing $2^p$ bits in which each bit corresponds to a memory block having a size of $2^q$ bytes. For example, if the memory block size is 64 bytes (i.e., p=6), and each region has a size of 4 kB (i.e., p+q=12), the presence vectors has 64 bits (i.e., $2^q=2^6=64$).

The size of the RAT is determined in proportion to the size of the cache and the average amount of spatial locality. A reasonable sized RAT can contain two region entries for every 4 kB of cache capacity. For a 2 MB cache, this results in a 1024 entry RAT, which requires roughly 12 kB of on-chip storage.

Upon an access of the cache by the processor for data in a block of a region including plurality of memory blocks and located within the main memory, the RECAP hardware, either alone or in combination with the hypervisor, stores region group identifier bits that identify that region in a region group identifier of a selected RAT entry among the plurality of RAT entries. Further, upon the access of the cache, the RECAP hardware, either alone or in combination with the hypervisor, stores block presence identifier bits that identify at least one block among the plurality of memory blocks in a block presence vector of the selected RAT entry. A bit of the block presence vector represents the memory block including the address.

In one embodiment, the plurality of RAT entries is organized as an M×N array of RAT entries. Specifically, the plurality of RAT entries can be organized as an M×N array of RAT entries. Each of M rows of the M×N array of the RAT entries can be configured to correspond to a unique value for the intra-group region identifier bits. In this case, the number of bits of the intra-group region identifier bits, i.e., the integer s, can be determined by the following formula: s=ceil($Log_2$ M), in which ceil is a function that generates a least small integer that is not less than an operand in parenthesis thereafter. In this case, the total number of bits in the region group identifier bits (which is the integer r) is equal to a total number of bits (which is the integer r+s) identifying the region of the main memory less ceil ($Log_2$ M) (which is the integer s).

For example, if M is 3 or 4, s is 2, and if M is 5, 6, 7, or 8, s is 3. Thus, the value of M is greater than $2^{s-1}$ and does not exceed $2^s$. In one embodiment, the value of s can be from 1 to 16. In another embodiment, the value of s can be from 2 to 8. The value of r depends on the total size of the main memory, the size of a region, and the size of the intra-group region identifier bits. In one embodiment, the value of r can be from 1 to 24. In another embodiment, the value of r can be from 3 to 12.

In one embodiment, the region group identifier bits include r most important bits of the region tag identifying the region. The relative location of a row among M rows of the M×N array represents the s least important bits of the region tag. A combination of the r most important bits and the s least important bits unambiguously identify the region.

An entry within a row of the M×N array can be identified as the selected RAT entry in the following manner. A 1-to-1 correspondence is established between all possible values for the intra-group region identifier bits and the rows of the M×N array. Then, the row that is associated with the intra-group region identifier (which is a remnant of the specified address identifying the region of the specified address after removing the region group identifier) is selected as the row from which a RAT entry is to be selected.

The RAT entries within a same row in the M×N array of RAT entries represent N different regions having a same set of s least important bits in each region tag identifying the N different regions. In other words, the addresses for the regions represented by the region group identifiers within the same row of the M×N array of RAT entries differ from one another only within the first r most important bits corresponding to the region group identifier bits, which are individually stored for each region, and have a same s least important bits that is impliedly associated with the row by the design of the RAT.

The least recent use (or most recent use) of the regions within a same row can be tracked by assigning a unique number corresponding to the order of the least recent use (or the most recent use). In one embodiment, the RAT can be configured to store the N different regions within the same row of the M×N array in an order of least recent use or most recent use across N columns of the M×N array. In one embodiment, each of the RAT entries can include least recent use (LRU) order bits configured to represent a least recently used order for regions represented by N RAT entries within a same row of the M×N array. The LRU order bits include t bits, in which t is given by ceil ($Log_2$ N).

For example, if N is 3 or 4, t is 2, and if N is 5, 6, 7, or 8, t is 3. Thus, the value of N is greater than $2^{t-1}$ and does not exceed $2^t$. In one embodiment, the value oft can be from 1 to 16. In another embodiment, the value oft can be from 2 to 8.

The LRU bits in all RAT entries within the row including the selected RAT entry can be altered to represent the least recently used order (which is the opposite of the most recently used order) for regions represented by RAT entries within the row including the selected RAT entry.

Further, each of the RAT entries can include a valid bit configured to be reset to a default value during a reset of the RAT, and configured to be set to a non-default value when information is stored in the region group identifier and the block presence vector of that RAT entry. During operation of the RAT, a value for the selected RAT entry can be set to a non-default value when information is stored in the region group identifier of the selected RAT entry and the block presence vector of the selected RAT entry.

Further, each of the RAT entries can include a reuse bit configured to represent multiple accesses by the processor to the cache for data within at least one byte in a same region among the main memory during cache accesses tracked by the RAT. In one embodiment, during operation of the RAT, the reuse bit in the selected RAT entry can be set only if the block presence vector indicates a previous access of the cache by the processor for at least one byte in the block.

Referring back to FIG. 1, in addition to the RAT, the RECAP uses a set of region prefetch lists (RPL) stored in a portion of the main memory that is reserved for this purpose. A hypervisor, or a partition manager, is responsible for allocating RPL in a reserved portion of main memory, and for assigning one RPL for every partition that will use the RECAP mechanism.

Each RPL contains a number of entries, with each entry consisting of a region tag and a presence vector similar to those in the RAT. These entries are used to produce a list of blocks to prefetch when the associated partition executes. The hypervisor can allocate enough memory for each RPL so that it can contain as many entries as the RAT.

Alternative implementations could allocate either smaller or larger amounts of memory for each RPL. In the case of smaller RPLs, only a fraction of the RAT could be saved, potentially limiting the benefit of the RECAP in order to reduce the bandwidth and total memory footprint. Larger RPLs can serve as victim buffers to increase the effective capacity of the RAT, potentially resulting in more useful prefetches at the cost of additional bandwidth and a larger memory footprint. In one embodiment, each RPL can be large enough to hold the contents of the RAT.

In addition, the RECAP uses two small on-chip buffers, which are herein referred to a write-back buffer and a prefetch first-in first-out (FIFO) buffer. The write-back buffer is a buffer that can be used to pack PRL entries as the RPL entries are written from the RAT to the main memory. The prefetch FIFO buffer is a buffer that can be used to pack unpack the RPL entries as the RPL entries are read from the main memory into the cache. In an exemplary illustration, 64-byte buffers can be used to pack and un-pack 98-bit RPL entries as they are written to and read from main memory.

The RECAP hardware can be operated in the following manner. The hypervisor, or the partition manager, is the software that is responsible for initiating the operation of the RECAP hardware. When the RECAP hardware is first activated, it resets all valid bits, reuse bits, least recent order bits, and presence vectors in the RAT to zero.

After the RAT is enabled, each cache access will search the RAT for an entry with a matching region tag. If a matching region tag is not found in the RAT, then the least recently used RAT entry (or an invalid entry, if one exists) is selected, and its reuse bit and presence vector are reset to zero, its valid bit is set to one, and its region tag is set based on the address in the cache request. Once an entry in the RAT is selected, the block offset bits from the requested address are used to select a bit in the presence vector, and that bit is set to one. Specifically, the p bits within the address identify one of the $2^p$ memory blocks within the same region. For example, if each region includes 64 blocks, and the address in the cache request refers to the 10th block within a region, the presence vector can be: 0000000001000000000000000000000000000000000000000000000000000000. The t bits tracking the least recent use (LRU) order are set accordingly to reflect the order of the least recent use within the same row in the RAT as the selected entry. For example, if the RAT includes 16 columns, the LRU bits for the selected entry can be set to 0000, and the LRU bits for entries that previously had a value from 0000 to 1111 are incremented by 1 (1111 becomes 0000), and the valid bit for the entry that had an LRU bit of 1111 is set to 0.

If a matching region tag is found in the RAT, but the bit of the presence vector corresponding to the cache access has a value of 0, i.e., was not accessed previously within the time frame tracked by the RAT, then the matching RAT entry is selected, and the corresponding bit in the presence vector is set to 1. For example, if each region includes 64 blocks, and the address in the cache request refers to the 12th block within a region, the presence vector had a previous value of: 0000000001000000000000000000000000000000000000000000000000000000, then the new value for the presence vector can be: 0000000001010000000000000000000000000000000000000000000000000000. The t bits tracking the least recent use (LRU) order are set accordingly to reflect the order of the least recent use within the same row in the RAT as the selected entry. For example, if the RAT includes 16 columns, the LRU bits for the selected entry can be set to 0000, and the LRU bits for entries that previously had a value from 0000 to 1111 are incremented by 1 (1111 becomes 0000), and the valid bit for the entry that had an LRU bit of 1111 is set to 0.

If a matching region tag is found in the RAT, and the bit of the presence vector corresponding to the cache access has a value of 1, i.e., was previously accessed within the time frame tracked by the RAT, then the matching RAT entry is selected, and the reuse bit for the RAT entry is set to one, indicating that this region has seen at least one cache hit during the current execution interval.

This process repeats for every access request received by the cache until the hypervisor initiates a partition switch. In addition to the normal operations the hypervisor performs as part of a partition switch, it also notifies the RECAP of the partition switch and provides the address of the RPL for the outgoing partition.

If the incoming partition has RPL stored in memory, then the hypervisor also provides the information on the location of the stored RPL to the RECAP. Once the hypervisor has finished these partition switch operations, normal execution begins for the newly active partition.

At this point, the RECAP coordinates three parallel tasks. The first task is reading RPL entries from main memory for the incoming partition and issuing prefetches. The second task is writing the RAT entries from the outgoing partition to corresponding RPL in main memory. The third task is updating RAT entries for cache accesses from the incoming partition as it executes.

The prefetch buffer (represented as a FIFO prefetch buffer in FIG. 1) can be configured to read the stored region prefetch lists from the portion of the memory, and to prefetch data from blocks in the main memory corresponding to the stored region prefetch list for the corresponding task. The stored region prefetch list can be read from the portion of the memory, and data is prefetched from blocks in the main memory that correspond to the stored prefetch list upon another partition switch or another context switch that initiates the same task as a task that previously generated the stored prefetch list.

Once the hypervisor provides the location of the RPL entries for the incoming partition or task, e.g., RPL i for an i-th partition or task, the RECAP hardware begins to read RPL entries of that RPL in blocks of a predetermined byte size into the prefetch FIFO buffer. The predetermined byte size can be, for example, 64 bytes. The RECAP issues prefetches for all blocks marked present in each RPL entry. Entries are removed from the prefetch FIFO buffer once all of the contents in the blocks therein have been prefetched, and new entries are read from the RPL in memory into the prefetch FIFO buffer as space becomes available. This process continues until all RPL entries have been read and all prefetches have been issued. When the next partition or task is initiated upon a next partition switch or a context switch, the RPL entries for the next incoming partition or task, i.e., RPL j for a j-th partition or task, the RECAP hardware begin to read RPL entries of that RPL in blocks of a predetermined byte size into the prefetch FIFO buffer.

In one embodiment, to avoid excessive bandwidth use, the RECAP can limit the number of outstanding prefetches to a predefined number, which can be, for example, four. As this process uses the prefetch FIFO buffer, it does not cause any contention with the other tasks proceeding in parallel.

In one embodiment, the RPL entries for the incoming partition or task can be read on demand as blocks are prefetched for the incoming partition or task. Alternately, the RPL entries can be read back starting from the most-recently accessed region to the least-recently accessed region.

The second parallel task includes writing entries to the RPL of the outgoing partition, so that useful prefetches can be issued the next time that partition executes. The RECAP scans every entry in the RAT, and each entry with both its valid and reuse bits set to one is copied to the write-back buffer. A RAT entry with both its valid and reuse bits set to one is a valid entry for the write-back operation. A RAT entry that is not a valid entry is not written back into the main memory. A RAT entry which does not have the reuse bit set, indicates that no cache block in that region was every re-used while being tracked in the RAT. So that region is treated as a streaming region without reuse, and the RAT entry is not written back into the main memory.

The write-back buffer is configured to receive valid entries (i.e., entries having 1 as the value of the valid bit) among the plurality of RAT entries, to temporarily store an address of at least one block for each of the valid entries, and to store region prefetch lists in a portion of the main memory for each block corresponding to one of the temporarily stored addresses. The valid entries among the plurality of RAT entries are stored as region prefetch list in a portion of the main memory on a partition switch or a context switch.

Thus, the write-back buffer collects the valid entries into blocks of a predefined size and writes them back to memory. The predetermined byte size can be, for example, 64 bytes. This scan proceeds in parallel with the execution of the newly active partition. To reduce memory contention, write-back requests make use of available bandwidth and have a lower priority than demand requests.

In general, the write-back buffer is in communication with the RAT and the main memory, and the steps of storing of the valid entries can include: transmitting the valid entries among the plurality of RAT entries from the RAT to the write-back buffer, temporarily storing an address of at least one block for each of the valid entries, storing the region prefetch list in a portion of the main memory for each block corresponding to one of the temporarily stored addresses, and invalidating the valid entries in the RAT after the transmitting of the valid entries. The invalidation of the valid entries in the RAT table provides the information to the RAT table that the RAT entry can be selected in during performance of subsequent tasks to encode new information on cache access during such subsequent tasks.

While the RECAP is scanning the RAT and writing entries into the RPL, the processor concurrently implements the incoming partition and issues cache requests. The RECAP coordinates updating the RAT for these requests with the ongoing scan operation.

In one embodiment, on a partition switch, the contents of the RAT can be instantaneously copied to a shadow RAT so that the outgoing partition's RAT entries are preserved while the incoming partition is allocating and modifying its own RAT entries. This simplifies the logic for coordinating these two tasks at the cost of doubling the RAT hardware overhead.

In one embodiment, the cost for implementing the RECAP hardware can be reduced by adding an additional incoming/outgoing bit to each RAT entry, thereby enabling data from two partitions to co-exist within the RAT simultaneously. Such an implementation introduces complexity, as the incoming partition may need to allocate new RAT entries faster than the existing entries can be written back to memory. However, in the event of resource starvation, the RECAP can discard either new RAT updates or existing RAT entries from the outgoing partition.

In one embodiment, the above approach can be further extended so that the RECAP can simply ignore any cache accesses that occur while the RAT is being scanned and written to the RPL in memory, in effect, serializing the RAT writeback and update phases, and eliminating the need for additional bits to differentiate incoming and outgoing RAT entries.

In one embodiment, the RAT updates and write-backs can compete for a single access port of the RAT. Since the RAT scan should require only a small portion of each partitions total execution window, and since RAT updates and write-backs are not part of the critical path, other policies for coordinating these two actions should have a minimal impact on overall performance.

Figure 3:
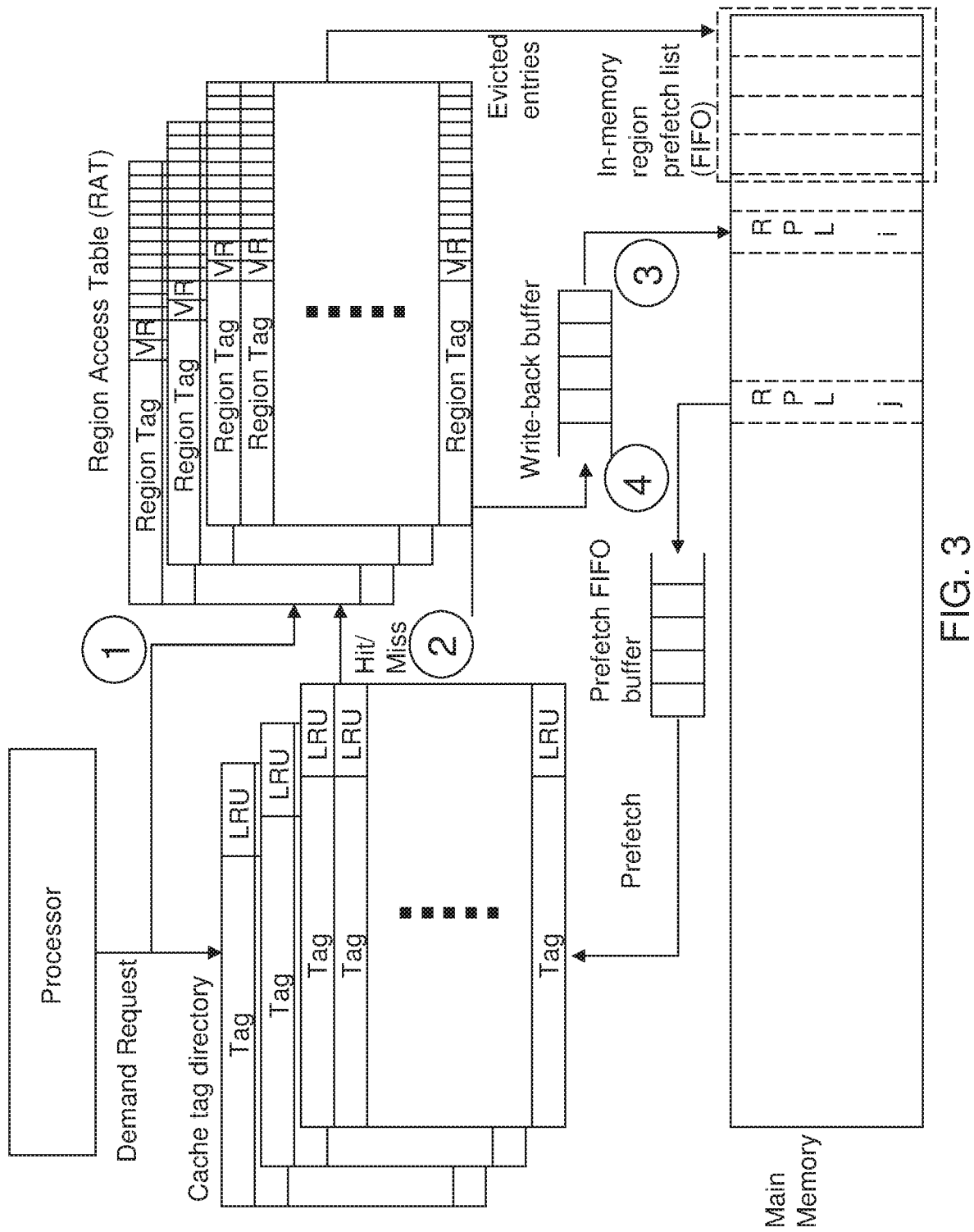
FIG. 3 is a schematic diagram illustrating a second exemplary hardware configuration for the RECAP according to an embodiment of the present disclosure.

FIG. 3 is a schematic diagram illustrating a second exemplary hardware for the RECAP according to an embodiment of the present disclosure. In the second exemplary hardware for the RECAP, a in-memory region prefetch list can be provided within a portion of the main memory. Evicted entries, i.e., the entries that become an (N+1)-th recently used entry with the encoding of a selected entry in a selected row, of the M×N array of RAT entries can be stored in the in-memory region prefetch list. Such an in-memory region prefetch list augments the corresponding prefetch list, and can be used to fetch additional data to the cache on last-in first-out basis.

Figure 4:
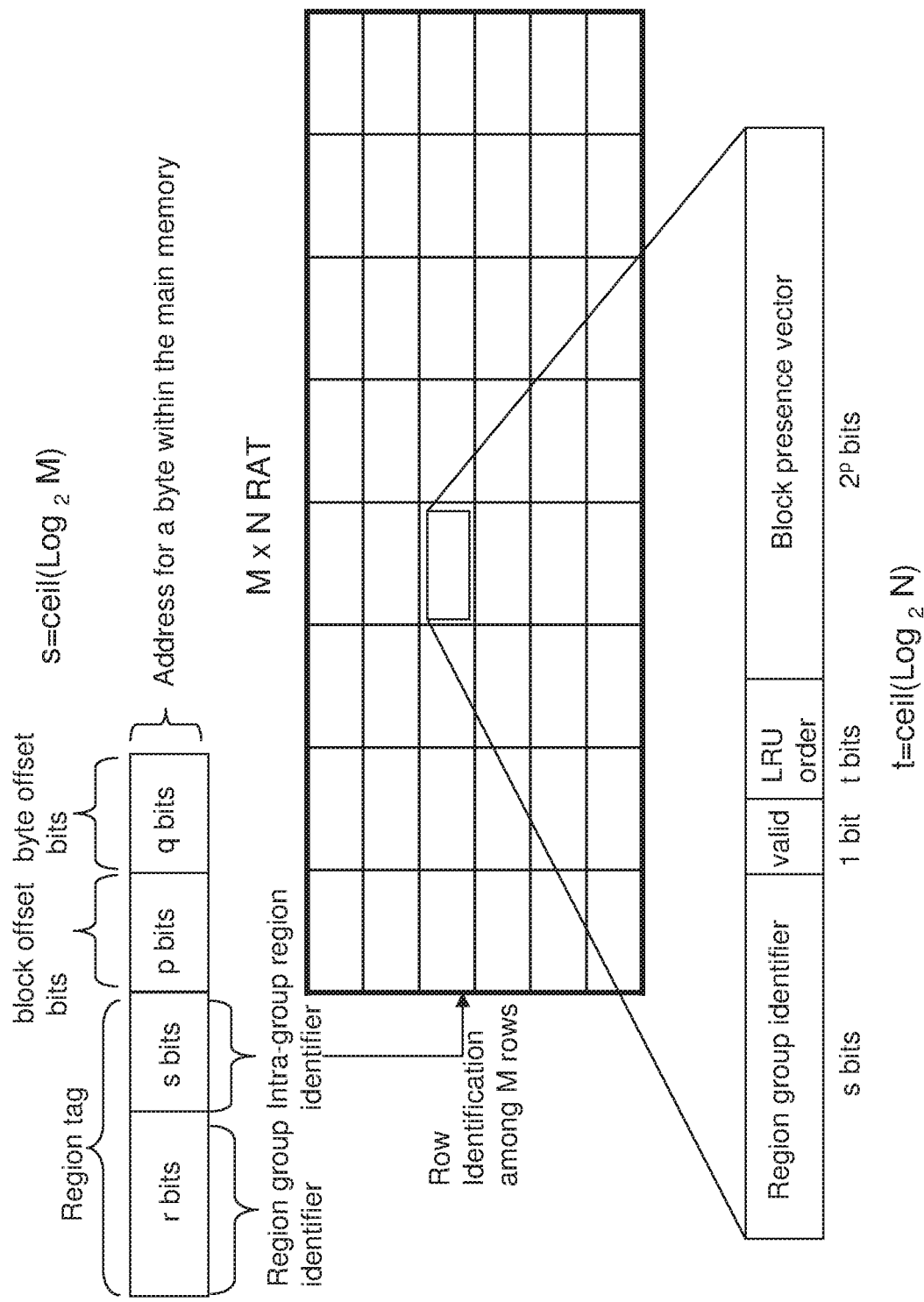
FIG. 4 is a schematic diagram illustrating a second exemplary RAT according to an embodiment of the present disclosure.

Referring to FIG. 4, a second exemplary RAT according to an embodiment of the present disclosure can be derived from the first exemplary RAT of FIG. 2 by removing the reuse bit. The block presence vector in each RAT entry can be configured to represent at least one block corresponding to a cache hit. In other words, the requirement for a cache access for the editing of a selected entry during the operation of the first exemplary RAT of FIG. 2 is replaced with the requirement for a cache hit for the editing of a selected entry during the operation of the second exemplary RAT of FIG. 4. In this case, the block presence identifier bits are changed only if there is a cache hit for the access of the cache by the processor.

In this embodiment, a RAT entry with its valid bit set to one is a valid entry for the write-back operation. A RAT entry that is not a valid entry is not written back into the main memory during the write-back operation.

Figure 5:
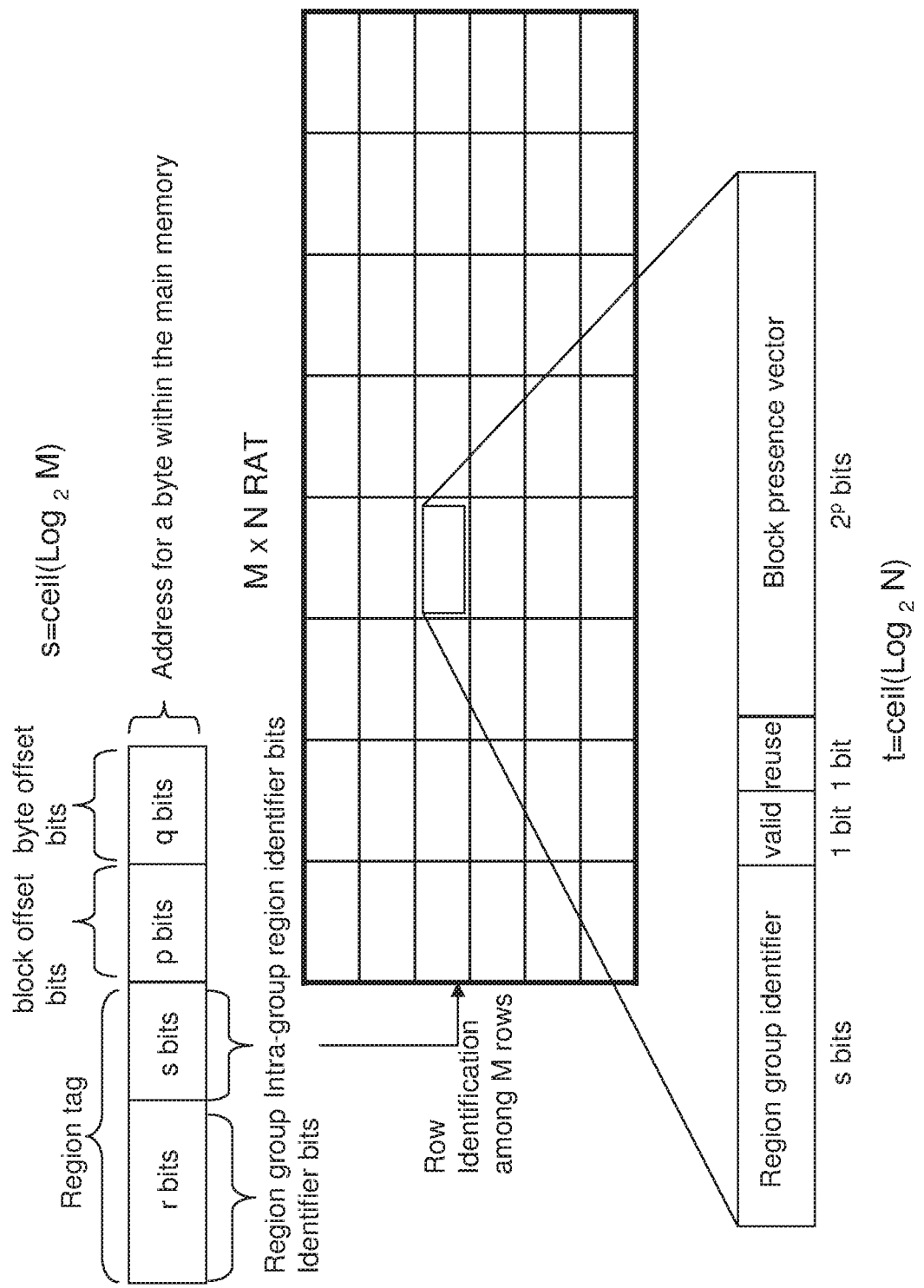
FIG. 5 is a schematic diagram illustrating a third exemplary RAT according to an embodiment of the present disclosure.

Referring to FIG. 5, a third exemplary RAT according to an embodiment of the present disclosure is derived from the first exemplary RAT of FIG. 2 by configuring the RAT to reordering the row including the selected RAT entry in an order of lease recent use or most recent use once all information is encoded in the selected RAT entry. In this case, the LRU order bits can be eliminated from each RAT entry.

Figure 6:
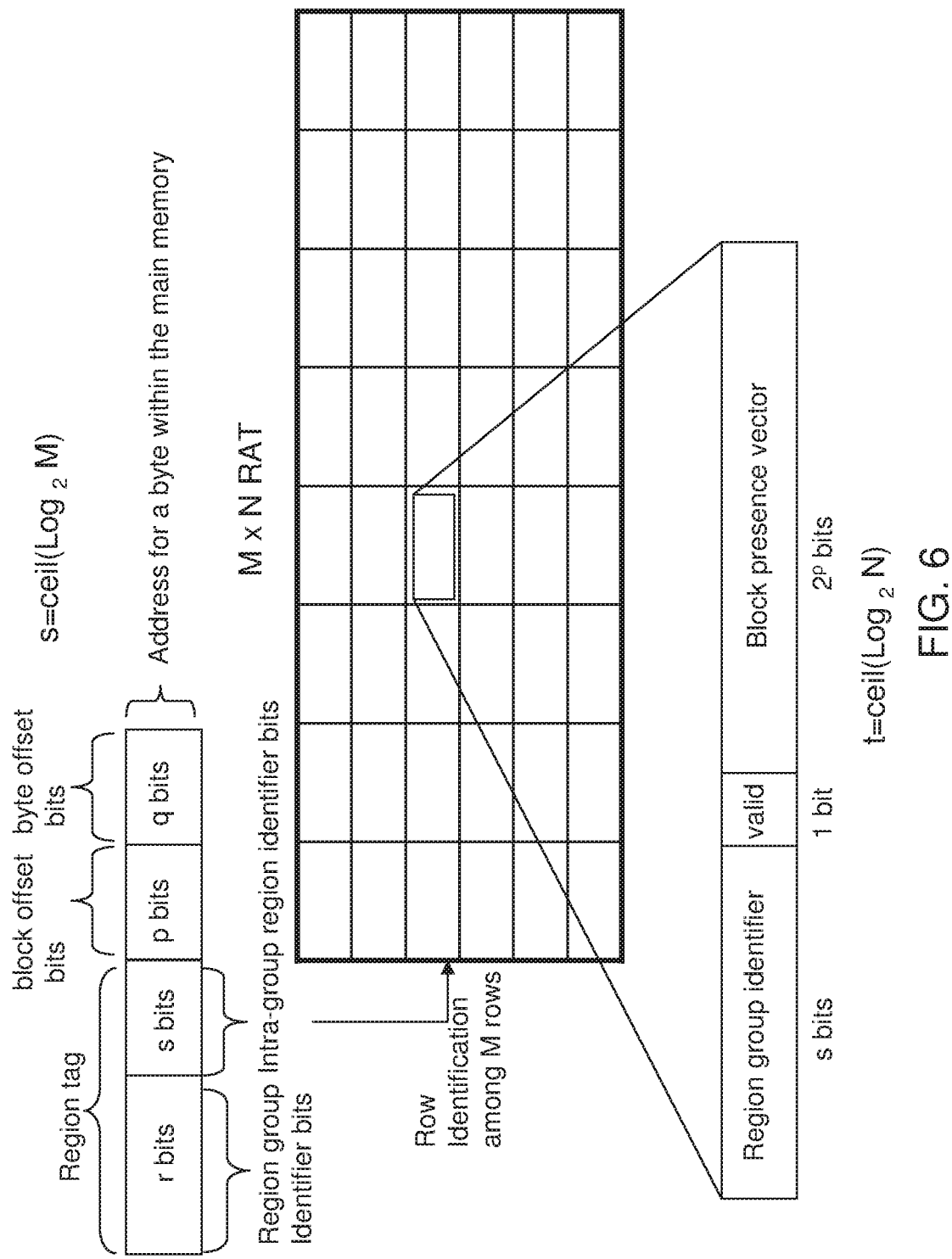
FIG. 6 is a schematic diagram illustrating a fourth exemplary RAT according to an embodiment of the present disclosure.

Referring to FIG. 6, a fourth exemplary RAT according to an embodiment of the present disclosure is derived from the second exemplary RAT of FIG. 4 by configuring the RAT to reorder the row including the selected RAT entry in an order of least recent use or most recent use once all information is encoded in the selected RAT entry. In this case, the LRU order bits can be eliminated from each RAT entry.

The RECAP prefetcher of the present disclosure can be employed to reduce the "cold" cache effects caused by multithreaded virtualization. The RECAP of the present disclosure exploits coarse-grain patterns in an applications memory access stream to restore the cache working set after a partition switch with minimal bandwidth overhead.

Compared to prior art cache restoration prefetcher, the RECAP uses less bandwidth and provides the same or better performance benefit in most instances. The RECAP offers lower hardware overhead for tracking a large number of blocks, lower bandwidth required to save and restore the list of blocks to prefetch after a partition switch, fewer prefetches of blocks that will not be used after a partition switch as a result of reuse-based filtering compared to prior art cache restoration prefetcher. Further, the RECAP of the present disclosure does not require any modifications to the design of the cache or cache tag directory or complex hardware for maintaining a large global LRU list of blocks in the cache.

While the disclosure has been described in terms of specific embodiments, it is evident in view of the foregoing description that numerous alternatives, modifications and variations will be apparent to those skilled in the art. Various embodiments of the present disclosure can be employed either alone or in combination with any other embodiment, unless expressly stated otherwise or otherwise clearly incompatible among one another. Accordingly, the disclosure is intended to encompass all such alternatives, modifications and variations which fall within the scope and spirit of the disclosure and the following claims.

What is claimed is:

1. A computing system comprising:
a processor, and wherein a plurality of virtual computing systems operate on the processor;
a cache in communication with said processor;
a main memory in communication with said cache; and
a region-based cache prefetcher for preloading the cache for the virtual systems, including grouping blocks of the cache into regions of memory, and when each of the virtual systems executes, identifying one or more of said regions for prefetching from the main memory and into the cache based on previous accesses by said each virtual system to the cache;
the region-based cache prefetcher comprising a region access table (RAT) configured to track access of memory blocks in said main memory, wherein said RAT comprises a plurality of RAT entries, and each of said RAT entries comprises:
a region group identifier to identify a region of said main memory that includes a plurality of memory blocks; and
a block presence vector to identify at least one block among said plurality of memory blocks; and
wherein the region-based cache prefetcher tracks cache hits during operation of each of the virtual computing systems to identify regions of the main memory where at least one cache block has had a cache hit during operation of said each virtual computing system,
the region-based cache prefetcher further includes a pre-fetch buffer, and
the region-based cache prefetcher reads into the pre-fetch buffer a list of the memory blocks to be pre-fetched, and prefetches, from the main memory, the memory blocks on said list, to prefetch the memory blocks identified in selected entries of the RAT for said each virtual computing system.

2. The computing system of claim 1, wherein:
said list read into the pre-fetch buffer comprises a regional prefetch list;
the region-based cache prefetcher writes the regional prefetch list in the pre-fetch buffer; and
the region-based cache prefetcher prefetches data from the blocks in the main memory corresponding to the region prefetch list written into the pre-fetch buffer.

3. The computing system of claim 2, wherein entries are removed from the pre-fetch buffer once all of the contents in the blocks identified in said entries have been prefetched from the main memory.

4. The computing system of claim 3, wherein new entries are read from the region prefetch list in the main memory into the pre-fetch buffer as space become available in the pre-fetch buffer.

5. The computing system of claim 2, wherein entries on the region pre-fetch list are read in blocks of a predetermined size into the pre-fetch buffer.

6. The computing system of claim 1, wherein:
each of the RAT entries further includes one or more bits to indicate one or more pre-defined conditions of said each of the RAT entries; and
the selected entries from the RAT are selected based on the one or more pre-defined conditions of the entries of the RAT.

7. The computing system of claim 6, wherein one of said bits indicates whether the memory block corresponding to the address represented by the block presence vector has been accessed by the processor in a defined period of time.

8. The computing system of claim 1, wherein said plurality of RAT entries is organized as an M×N array of RAT entries.

9. The computing system of claim 8, wherein:
RAT entries within a same row in said M×N array of RAT entries represent N different regions: and
said RAT is configured to store said N different regions within said same row of said M×N array in an order of least recent use or most recent use across N columns of said M×N array.

10. The computing system of claim 1, wherein each of said RAT entries comprises a reuse bit configured to represent multiple accesses by said processor to said cache for data within at least one byte in a same block among said main memory during cache accesses tracked by said RAT.

11. A method for operating a computing system, said method comprising:
providing a computing system comprising:
a processor, and wherein a plurality of virtual computing systems operate on the processor;
a cache in communication with said processor;
a main memory in communication with said cache; and
a region-based cache prefetcher for preloading the cache for the virtual systems, including grouping blocks of the cache into regions of memory, and when each of the virtual systems executes, identifying one or more of said regions for prefetching from the main memory and into the cache based on previous accesses by said each virtual system to the cache;
the region-based cache prefetcher comprising a region access table (RAT) configured to track access of memory blocks in said main memory, wherein said RAT comprises a plurality of RAT entries, and each of said RAT entries comprises a region group identifier field and a block presence vector field;
the region-based cache prefetcher, upon an access of said cache by said processor for data in a byte in a block of a region including plurality of memory blocks and located within said main memory, storing an identifier of said region in the region group identifier field of one of the RAT entries; and upon said access of said cache, storing an identifier of at least one block among said plurality of memory blocks in the block presence vector field of the one of the RAT entries;
the region-based cache prefetcher tracking cache hits during operation of each of the virtual computing systems to identify regions of the main memory where at least one cache block has had a cache hit during operation of said each virtual computing system,
the region-based cache prefetcher further includes a pre-fetch buffer, and
the region-based cache prefetcher reads into the pre-fetch buffer a list of the memory blocks to be pre-fetched, and prefetching, from the main memory, the memory blocks on said list to prefetch the memory blocks identified in selected entries of the RAT for said each virtual computing system.

12. The method of claim 11, wherein:
said list read into the pre-fetch buffer comprises a regional prefetch list;
the region-based cache prefetcher writes the regional prefetch list in the pre-fetch buffer; and
the region-based cache prefetcher prefetches data from the blocks in the main memory corresponding to the region prefetch list written into the pre-fetch buffer.

13. The method of claim 12, wherein entries are removed from the pre-fetch buffer once all of the contents in the blocks identified in said entries have been prefetched from the main memory.

14. The method of claim 13, wherein new entries are read from the region prefetch list in the main memory into the pre-fetch buffer as space become available in the pre-fetch buffer.

15. The method of claim 12, wherein entries on the region pre-fetch list are read in blocks of a predetermined size into the pre-fetch buffer.

16. The method of claim 11, wherein:
each of the RAT entries further includes one or more bits to indicate one or more predefined conditions of said each of the RAT entries; and
the selected entries from the RAT are selected based on the one or more pre-defined conditions of the entries of the RAT.

17. The method of claim 16, wherein one of said bits indicates whether the memory block corresponding to the address represented by the block presence vector has been accessed by the processor in a defined period of time.

18. The method of claim 1, wherein said plurality of RAT entries is organized as an M×N array of RAT entries.

19. The method of claim 18, wherein:
RAT entries within a same row in said M×N array of RAT entries represent N different regions: and
said RAT is configured to store said N different regions within said same row of said M×N array in an order of least recent use or most recent use across N columns of said M×N array.

20. The computing system of claim 11, wherein each of said RAT entries comprises a reuse bit configured to represent multiple accesses by said processor to said cache for data within at least one byte in a same block among said main memory during cache accesses tracked by said RAT.

* * * * *